(12) United States Patent
Qi

(10) Patent No.: US 12,511,859 B2
(45) Date of Patent: Dec. 30, 2025

(54) DOT MATRIX PROJECTOR, FACIAL RECOGNITION MODULE, AND ELECTRONIC DEVICE

(71) Applicant: TRIPLE WIN TECHNOLOGY(SHENZHEN) CO. LTD., Shenzhen (CN)

(72) Inventor: Wei-Wei Qi, Guangdong (CN)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 56 days.

(21) Appl. No.: 18/430,991

(22) Filed: Feb. 2, 2024

(65) Prior Publication Data

US 2025/0148741 A1 May 8, 2025

(30) Foreign Application Priority Data

Nov. 2, 2023 (CN) .......................... 202311458283.X

(51) Int. Cl.
*G06V 10/143* (2022.01)
*G02B 27/14* (2006.01)
*G02B 27/42* (2006.01)
*G06V 10/145* (2022.01)
*H04N 23/11* (2023.01)
*H04N 23/56* (2023.01)

(52) U.S. Cl.
CPC ........... *G06V 10/143* (2022.01); *G02B 27/14* (2013.01); *G02B 27/4233* (2013.01); *G06V 10/145* (2022.01); *H04N 23/11* (2023.01); *H04N 23/56* (2023.01)

(58) Field of Classification Search
CPC .... G06V 10/143; G06V 10/145; H04N 23/56; H04N 23/11; G02B 27/14; G02B 27/4233
See application file for complete search history.

(56) References Cited

U.S. PATENT DOCUMENTS

| | | | | |
|---|---|---|---|---|
| 5,675,145 | A * | 10/1997 | Toda ....................... | B82Y 35/00 250/234 |
| 6,080,988 | A * | 6/2000 | Ishizuya ............ | G02B 26/0866 250/370.08 |
| 6,274,873 | B1 * | 8/2001 | Outwater .............. | G01J 3/4406 250/271 |
| 2018/0121643 | A1 * | 5/2018 | Talwerdi ................ | G07C 9/257 |
| 2021/0356724 | A1 * | 11/2021 | Semenov .................. | G01J 9/02 |

* cited by examiner

*Primary Examiner* — Jonathan R Messmore
(74) *Attorney, Agent, or Firm* — ScienBiziP, P.C.

(57) ABSTRACT

A dot matrix projector includes an infrared light source used to emit infrared light, a collimating lens, a semi-transparent and semi-reflective plate on an output side of the collimating lens, a diffractive optical element on an output path of the semi-transparent and semi-reflective plate, and an infrared light conversion film on another output path of the semi-transparent and semi-reflective plate. The collimating lens is used to receive the infrared light from the infrared light source and collimate the infrared light to be parallel infrared light. The semi-transparent and semi-reflective plate is used to divide the parallel infrared light into a first part directly transmitting the semi-transparent and a second part being reflected by the semi-transparent and semi-reflective plate. The infrared light conversion film is configured to convert infrared light into visible light. A facial recognition module and an electronic device are also provided.

17 Claims, 4 Drawing Sheets

DOT MATRIX PROJECTOR, FACIAL RECOGNITION MODULE, AND ELECTRONIC DEVICE

FIELD

The subject matter herein generally relates to optical field, particularly relates to a dot matrix projector, a facial recognition module and an electronic device having the dot matrix projector.

BACKGROUND

With the development of facial recognition technology, consumer electronic products having facial recognition functions have been widely used. In order to achieve the facial recognition function, a smartphone generally includes a dot matrix projector and an infrared camera. The dot matrix projector emits multiple (such as thousands to tens of thousands) light points to a face, and the infrared camera receives reflected light points, a surface contour of a virtual face is calculated and compared with a certified face information. However, as an important module of facial recognition technology, the dot matrix projector currently has relatively limited functional and cannot meet the multifunctional requirements of products.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
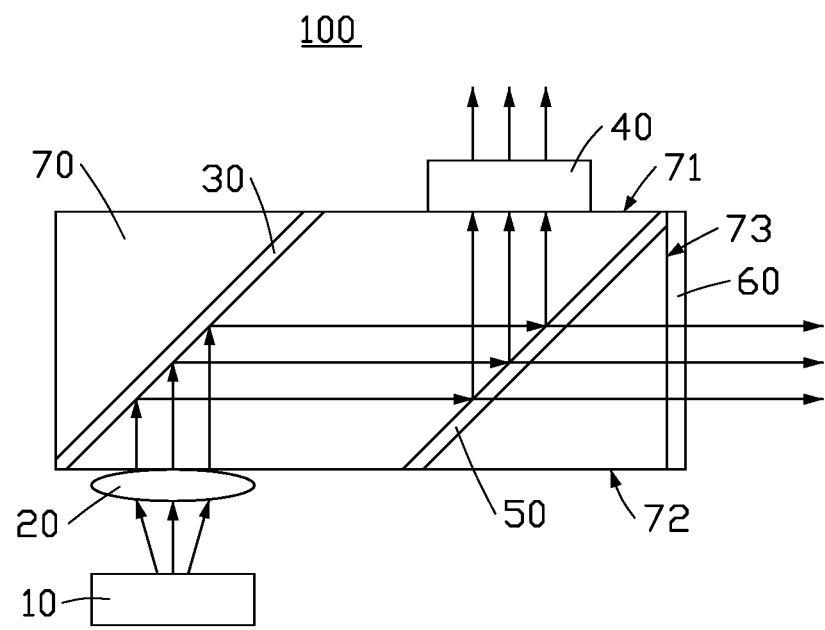
FIG. 1 is a schematic view of a dot matrix projector according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

The present disclosure provides a dot matrix projector. The dot matrix projector emits infrared light in a direction for facial recognition, but also emits non infrared light (visible light) in other direction as a light source for other modules or structures.

First Embodiment

FIG. 1 shows a dot matrix projector 100 of a first embodiment. The dot matrix projector 100 includes an infrared light source 10, a collimating lens 20, a total reflection plate 30, a diffractive optical element 40, a semi-transparent and semi-reflective plate 50, and an infrared light conversion film 60.

The infrared light source 10 is used to emit infrared light. As shown in FIG. 1, the collimating lens 20 is spaced apart from the infrared light source 10 and faces an output surface of the infrared light source 10. The collimating lens 20 is used to receive infrared light from the infrared light source 10 and collimate and converge the infrared light having different directions to be parallel infrared light.

As shown in FIG. 1, the total reflection plate 30 is on an output side of the collimating lens 20. The total reflection plate 30 includes a reflecting surface for totally reflecting light incident on the reflecting surface to change a propagation direction of infrared light. In the present embodiment, the reflecting surface of the total reflection plate 30 and an optical axis direction of the parallel light emitted from the collimating lens 20 form an angle of 45 degrees. In this way, after the parallel light emitted from the collimating lens 20 passes through the total reflection plate 30, the optical axis direction changes to be perpendicular to the original parallel light.

As shown in FIG. 1, the semi-transparent and semi-reflective plate 50 is on a reflection path of the total reflection plate 30 to divide the incident light into two parts and emit from different directions. A part of the incident light (such as about half of the incident light) directly transmits the semi-transparent and semi-reflective plate 50 and emits, and the remaining incident light is reflected by the semi-transparent and semi-reflective plate 50. The total reflection plate 30 is between the collimating lens 20 and the semi-transparent and semi-reflective plate 50. The semi-transparent and semi-reflective plate 50 can achieve reflecting and transmitting. In addition, a ratio of reflected and transmitted infrared light by the semi-transparent and semi-reflective plate 50 can be adjusted and designed according to needs, and it may not necessarily be half of the incident light reflection and half of the incident light transmission.

In the present embodiment, the semi-transparent and semi-reflective plate 50 is parallel to the total reflection plate 30, but not limited to this. In this way, after passing through the semi-transparent and semi-reflective plate 50, half of the infrared light is reflected and emitted, and half of the infrared light is directly transmitted and emitted. The optical axis of the reflected infrared light and the optical axis of the transmitted infrared light are perpendicular to each other.

As shown in FIG. 1, the diffractive optical elements 40 and the infrared light conversion film 60 are on two output paths of the semi-transparent and semi-reflective plate 50. In the present embodiment, the diffractive optical element 40 is on a reflection path of the semi-transparent and semi-reflective plate 50, and the infrared light conversion film 60 is on a transmission path of the semi-transparent and semi-reflective plate 50, but not limited to this. In other embodiments, the diffractive optical element 40 can be on the transmission path of the semi-transparent and semi-reflective plate 50, and the infrared light conversion film 60 can be on the reflection path of the semi-transparent and semi-reflective plate 50.

The diffractive optical element 40 is used to diffract received light to form multiple (such as thousands or tens of thousands) infrared light spots. The infrared light spots will be projected onto the surface of an object (such as a face) for facial recognition. The diffractive optical element 40 typically have microstructures to change phase of light. By designing the microstructures of the optical diffraction element reasonably, any light that conforms to the designed intensity distribution can be output when inputting specific light.

The infrared light conversion film 60 is used to convert the incident infrared light into visible light. The visible light emitted by the infrared light conversion film 60 can be used as a visible light backlight or as required light for other modules.

The infrared light conversion film 60 includes a substrate (not shown) and a conversion layer (not shown) located on the substrate. The substrate can be made of materials such as polystyrene, polyethylene terephthalate, polycarbonate, glass, etc. In one embodiment, the conversion layer may include diamond like structures composed of tin and sulfur and organic molecules encapsulating the diamond like structures. When near-infrared light enters the conversion layer, wavelength of the near-infrared light will change to be wavelength of visible light to the human eye by a nonlinear interaction process. When infrared light is irradiated on the conversion layer, the material of the conversion layer absorbs infrared photons having greater wavelengths and lower energy, and then releases visible photons having shorter wavelengths and higher energy. According to the law of conservation of energy, this material can only emit one visible light photon by absorbing multiple infrared photons. In another embodiment, the conversion layer includes nano ions and silica microspheres decorated by metal structure.

As shown in FIG. 1, the dot matrix projector 100 further includes a lens 70. The lens 70 is made of transparent material and the infrared light can transmit inside the lens 70. Both the total reflection plate 30 and the semi-transparent and semi-reflective plate 50 are embedded in the lens 70. The collimating lens 20, the diffractive optical element 40, and the infrared light conversion film 60 are attached to outer surfaces of the lens 70.

As shown in FIG. 1, in the present embodiment, the lens 70 includes a front surface 71, a back surface 72 parallel and opposite to the front surface 71, and a side surface 73 connected between the front surface 71 and the back surface 72. The infrared light source 10 is on a side of the back surface 72 of the lens 70 and is spaced apart from the back surface 72. The collimating lens 20 is attached to the back surface 72 of the lens 70 and is spaced apart from and faces the infrared light source 10. The total reflection plate 30 and the semi-transparent and semi-reflective plate 50 are parallel to each other and spaced apart from each other in the lens 70, and are tilted between the front surface 71 and the back surface 72. The infrared light conversion film 60 is attached to the side surface 73 of the lens 70, and the diffractive optical element 40 is attached to the front surface 71 of the lens 70. In this way, the infrared spot passing through the diffractive optical element 40 is emitted from the front surface 71 of the lens 70, and the visible light converted by the infrared light conversion film 60 is emitted from the side surface 73 of the lens 70, achieving the bidirectional projection function of the front surface 71 and side surface 73 of the lens 70.

Second Embodiment

Figure 2:
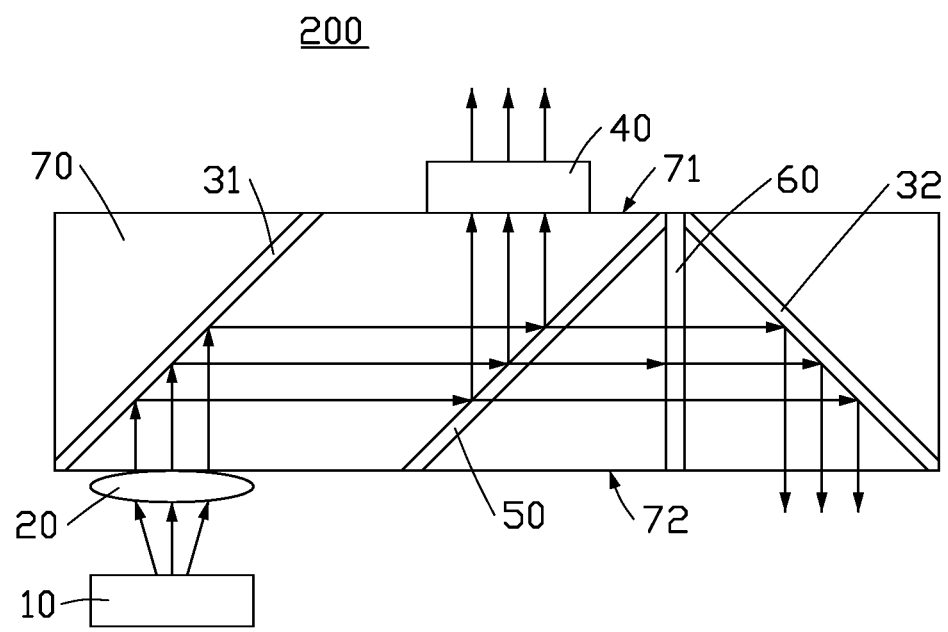
FIG. 2 is a schematic view of a dot matrix projector according to a second embodiment of the present disclosure.

FIG. 2 illustrates a dot matrix projector 200 of a second embodiment. The dot matrix projector 200 includes an infrared light source 10, a collimating lens 20, two total reflection plates, a diffractive optical element (DOE) 40, a semi-transparent and semi-reflective plate 50, and an infrared light conversion film 60. The two total reflection plates are a first total reflection plate 31 and a second total reflection plate 32.

As shown in FIG. 2, the collimating lens 20 locates on an output path of the infrared light source 10. The collimating lens 20 is used to receive infrared light from the infrared light source 10 and collimate and converge the infrared light in different directions to be parallel light.

As shown in FIG. 2, the first total reflection plate 31 is on an output side of the collimating lens 20 and used to totally reflecting the parallel light to change a propagation direction of the infrared light. In the present embodiment, a reflecting surface of the first total reflection plate 31 and an optical axis direction of the parallel light emitted from the collimating lens 20 form an angle of 45 degree.

As shown in FIG. 2, the semi-transparent and semi-reflective plate 50 is on a reflection path of the first total reflection plate 31 to divide the incident light into two parts and emit from different directions. For example, about half of the incident light directly transmits the semi-transparent and semi-reflective plate 50 and emits, and the remaining incident light is reflected by the semi-transparent and semi-reflective plate 50. In the present embodiment, the semi-transparent and semi-reflective plate 50 is parallel to the first total reflection plate 31.

As shown in FIG. 2, the diffractive optical elements 40 is on a reflection path of the semi-transparent and semi-reflective plate 50, and the infrared light conversion film 60 and the second total reflection plate 32 are sequentially set on a transmitting path of the semi-transparent and semi-reflective plate 50. The infrared light conversion film 60 is between the semi-transparent and semi-reflective plate 50 and the second total reflection plate 32. In this way, light transmitted by the semi-transparent and semi-reflective plate 50 is converted into other light (such as visible light) and emitted from the infrared light conversion film 60, and then reflected when reaches a reflection surface of the second total reflective plate 32.

It can be understood that in the second embodiment, a position of the infrared light conversion film 60 can be adjusted, rather than being between the infrared light conversion film 60 and the second total reflection plate 32. For example, the infrared light conversion film 60 is on the output path of the second total reflection plate 32. That is, the second total reflection plate 32 is between the semi-transparent and semi-reflective plate 50 and the infrared light conversion film 60. The light transmitted by the semi-transparent and semi-reflective plate 50 is reflected and emitted by the second total reflective plate 32, and then converted into visible light by the infrared light conversion film 60.

As shown in FIG. 2, the dot matrix projector 200 further includes a lens 70. The lens 70 is made of transparent material. Both the first total reflection plate 31, the second total reflection plate 32, the semi-transparent and semi-reflective plate 50, and the infrared light conversion film 60 are embedded in the lens 70. The collimating lens 20 and the diffractive optical element 40 are attached to outer surfaces of the lens 70.

In the present embodiment, as shown in FIG. 2, the lens 70 includes a front surface 71, a back surface 72 parallel to and opposite to the front surface 71, and a side surface 73 connected between the front surface 71 and the back surface 72. The infrared light source 10 is on a side of the back surface 72 of the lens 70 and is spaced apart from the back surface 72. The collimating lens 20 is attached to the back surface 72 of the lens 70 and is spaced apart from and faces the infrared light source 10. The first total reflection plate 31 and the semi-transparent and semi-reflective plate 50 are parallel to each other and spaced apart from each other in the lens 70, and are tilted between the front surface 71 and the back surface 72. The first total reflection plate 31 is perpendicular to the semi-transparent and semi-reflective plate 50. The infrared light conversion film 60 is between the semi-transparent and semi-reflective plate 50 and the second total reflection plate 32. The infrared light conversion film 60 and the semi-transparent and semi-reflective plate 50 form an angle of 45 degrees. The infrared light conversion film 60 and the second total reflection plate 32 form an angle of 45 degrees. The infrared light conversion film 60 is perpendicular to both the front surface 71 and the back surface 72 and between the front surface 71 and the back surface 72. The diffractive optical element 40 is attached to the front surface 71.

In this way, the infrared spot passing through the diffractive optical element 40 is emitted from the front surface 71 of the lens 70, and the visible light converted by the infrared light conversion film 60 is emitted from the back surface 72 of the lens 70, achieving the bi-directional projection function of the front surface 71 and back surface 72 of the lens 70.

The dot matrix projectors 100, 200 has a simple structure and can emit infrared light from the front surface 71 for facial recognition and emit visible light from the back surface 72 or the side surface 73 as a light source for LED lights or time electronic screens.

Figure 3:
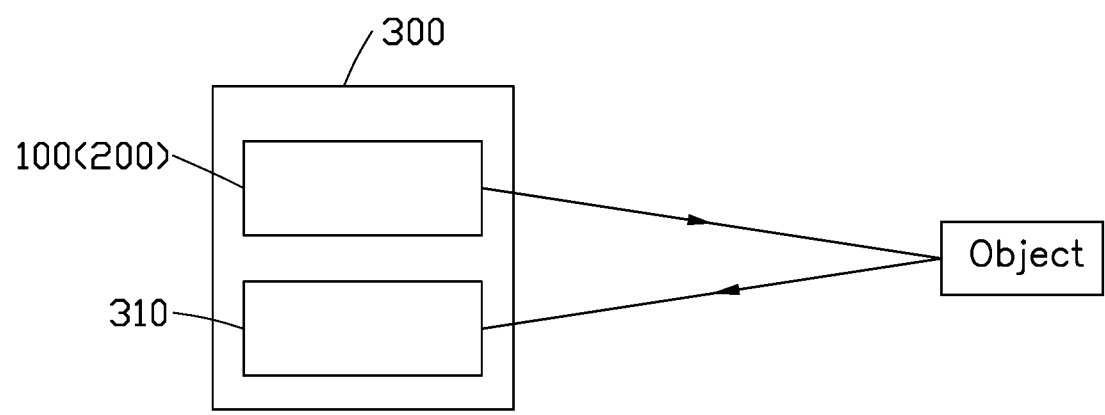
FIG. 3 is a schematic view of a face recognition module according to an embodiment of the present disclosure.

FIG. 3 illustrates a facial recognition module 300. The facial recognition module 300 includes the dot matrix projectors 100 (200) and an infrared camera 310. The dot matrix projectors 100 (200) is used to emit infrared light towards an object (such as a face). The infrared camera 310 is used to receive infrared light reflected by the object.

Figure 4:
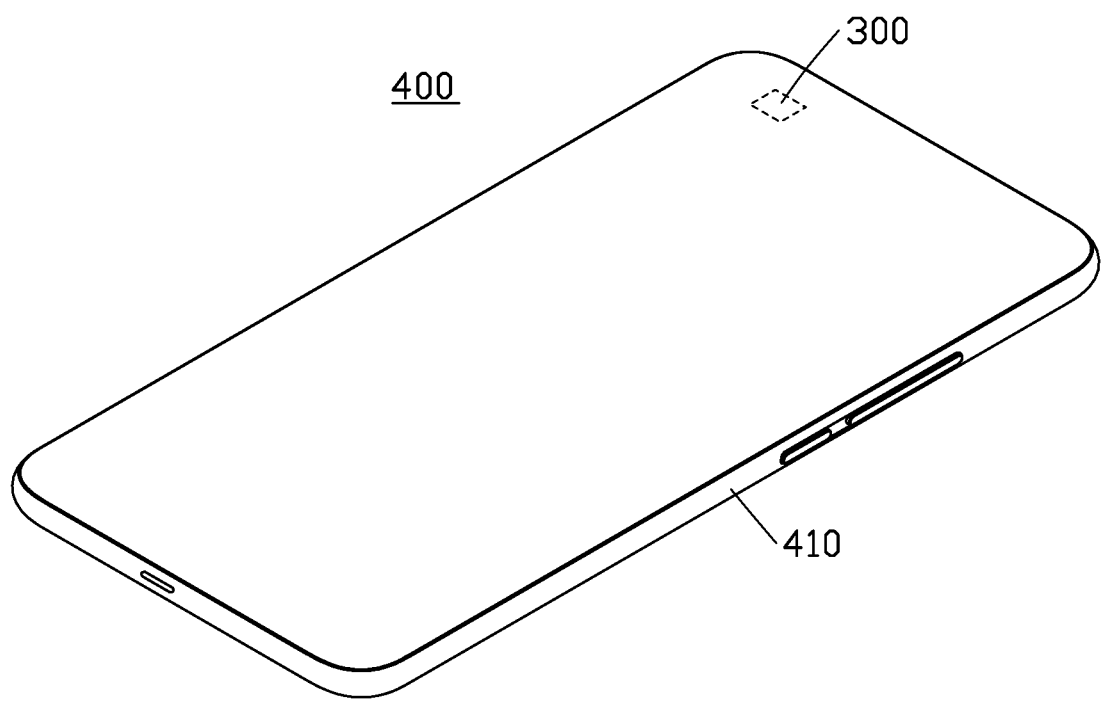
FIG. 4 is a schematic view of an electronic device according to an embodiment of the present disclosure.

FIG. 4 illustrates an electronic device 400 including the facial recognition module 300. The electronic device 400 includes a housing 410, and facial recognition module 300 is in the housing 410. This electronic device 400 can be a smartphone, a PAD, etc.

The dot matrix projector not only provides infrared light spots required for facial recognition, but also visible light can be used as a light source for LED lights or time display electronic screen lights. The dot matrix projector has multiple functions and meets the market's miniaturization needs.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A dot matrix projector comprising:
an infrared light source used to emit infrared light;
a collimating lens, the collimating lens used to receive the infrared light from the infrared light source and collimate the infrared light to be parallel infrared light;
a semi-transparent and semi-reflective plate on an output side of the collimating lens, the semi-transparent and semi-reflective plate used to divide the parallel infrared light into a first part directly transmitting the semi-transparent and a second part being reflected by the semi-transparent and semi-reflective plate;
a diffractive optical element on an output path of the semi-transparent and semi-reflective plate and configured to convert infrared light into infrared spots;
an infrared light conversion film on another output path of the semi-transparent and semi-reflective plate and configured to convert infrared light into visible light; and
a first total reflection plate and a second total reflection plate, wherein the first total reflection plate is between the collimating lens and the semi-transparent and semi-reflective plate, the second total reflection plate is on one of output paths of the semi-transparent and semi-reflective plate, and the infrared light conversion film is between the semi-transparent and semi-reflective plate and the second total reflection plate.

2. The dot matrix projector of claim 1, wherein the first total reflection plate and an optical axis direction of the parallel infrared light emitted from the collimating lens form an angle of 45 degrees; the semi-transparent and semi-reflective plate is parallel to the first total reflection plate; and the second total reflection plate is perpendicular to the semi-transparent and semi-reflective plate.

3. The dot matrix projector of claim 1, wherein the diffractive optical element is on a reflecting path of the semi-transparent and semi-reflective plate, and the infrared light conversion film is on a transmitting path of the semi-transparent and semi-reflective plate.

4. The dot matrix projector of claim 1, wherein the infrared light conversion film comprises a conversion layer, and the conversion layer comprises diamond like structures composed of tin and sulfur and organic molecules encapsulating the diamond like structures, or the conversion layer comprises nano ions and silica microspheres decorated by metal structure.

5. A facial recognition module comprising:
a dot matrix projector used to emit infrared light, the dot matrix projector comprising:
an infrared light source used to emit infrared light;
a collimating lens, the collimating lens used to receive the infrared light from the infrared light source and collimate the infrared light to be parallel infrared light;
a semi-transparent and semi-reflective plate on an output side of the collimating lens, the semi-transparent and semi-reflective plate used to divide the parallel infrared light into a first part directly transmitting the semi-transparent and a second part being reflected by the semi-transparent and semi-reflective plate;
a diffractive optical element on an output path of the semi-transparent and semi-reflective plate and configured to convert infrared light into infrared spots; and
an infrared light conversion film on another output path of the semi-transparent and semi-reflective plate and configured to convert infrared light into visible light; and
an infrared camera used to receive reflected infrared light;

wherein the infrared light conversion film comprises a conversion layer, and the conversion layer comprises diamond like structures composed of tin and sulfur and organic molecules encapsulating the diamond like structures, or the conversion layer comprises nano ions and silica microspheres decorated by metal structure.

6. The facial recognition module of claim 5, wherein the dot matrix projector further comprises a total reflection plate, the total reflection plate is between the collimating lens and the semi-transparent and semi-reflective plate.

7. The facial recognition module of claim 6, wherein the total reflection plate and an optical axis direction of the parallel infrared light emitted from the collimating lens form an angle of 45 degrees; and the semi-transparent and semi-reflective plate is parallel to the total reflection plate.

8. The facial recognition module of claim 5, wherein the dot matrix projector further comprises a first total reflection plate and a second total reflection plate, wherein the first total reflection plate is between the collimating lens and the semi-transparent and semi-reflective plate, the second total reflection plate is on one of output paths of the semi-transparent and semi-reflective plate.

9. The facial recognition module of claim 8, wherein the infrared light conversion film is between the semi-transparent and semi-reflective plate and the second total reflection plate.

10. The facial recognition module of claim 8, wherein the second total reflection plate is between the semi-transparent and semi-reflective plate and the infrared light conversion film.

11. The facial recognition module of claim 8, wherein the first total reflection plate and an optical axis direction of the parallel infrared light emitted from the collimating lens form an angle of 45 degrees; the semi-transparent and semi-reflective plate is parallel to the first total reflection plate; and the second total reflection plate is perpendicular to the semi-transparent and semi-reflective plate.

12. The facial recognition module of claim 5, wherein the diffractive optical element is on a reflecting path of the semi-transparent and semi-reflective plate, and the infrared light conversion film is on a transmitting path of the semi-transparent and semi-reflective plate.

13. An electronic device comprising:
a housing; and
the facial recognition module of claim 5 in the housing.

14. An electronic device comprising:
a housing; and
a facial recognition module in the housing, the facial recognition module comprising:
a dot matrix projector used to emit infrared light, the dot matrix projector comprising:
an infrared light source used to emit infrared light;
a collimating lens, the collimating lens used to receive the infrared light from the infrared light source and collimate the infrared light to be parallel infrared light;
a semi-transparent and semi-reflective plate on an output side of the collimating lens, the semi-transparent and semi-reflective plate used to divide the parallel infrared light into a first part directly transmitting the semi-transparent and a second part being reflected by the semi-transparent and semi-reflective plate;
a diffractive optical element on an output path of the semi-transparent and semi-reflective plate and configured to convert infrared light into infrared spots; and
an infrared light conversion film on another output path of the semi-transparent and semi-reflective plate and configured to convert infrared light into visible light; and
an infrared camera used to receive reflected infrared light;
wherein the dot matrix projector further comprises a first total reflection plate and a second total reflection plate, the first total reflection plate is between the collimating lens and the semi-transparent and semi-reflective plate, the second total reflection plate is on one of output paths of the semi-transparent and semi-reflective plate, and the infrared light conversion film is between the semi-transparent and semi-reflective plate and the second total reflection plate.

15. The electronic device of claim 14, wherein the first total reflection plate and an optical axis direction of the parallel infrared light emitted from the collimating lens form an angle of 45 degrees; the semi-transparent and semi-reflective plate is parallel to the first total reflection plate; and the second total reflection plate is perpendicular to the semi-transparent and semi-reflective plate.

16. The electronic device of claim 14, wherein the diffractive optical element is on a reflecting path of the semi-transparent and semi-reflective plate, and the infrared light conversion film is on a transmitting path of the semi-transparent and semi-reflective plate.

17. The electronic device of claim 14, wherein the infrared light conversion film comprises a conversion layer, and the conversion layer comprises diamond like structures composed of tin and sulfur and organic molecules encapsulating the diamond like structures, or the conversion layer comprises nano ions and silica microspheres decorated by metal structure.

* * * * *